Figure 1:
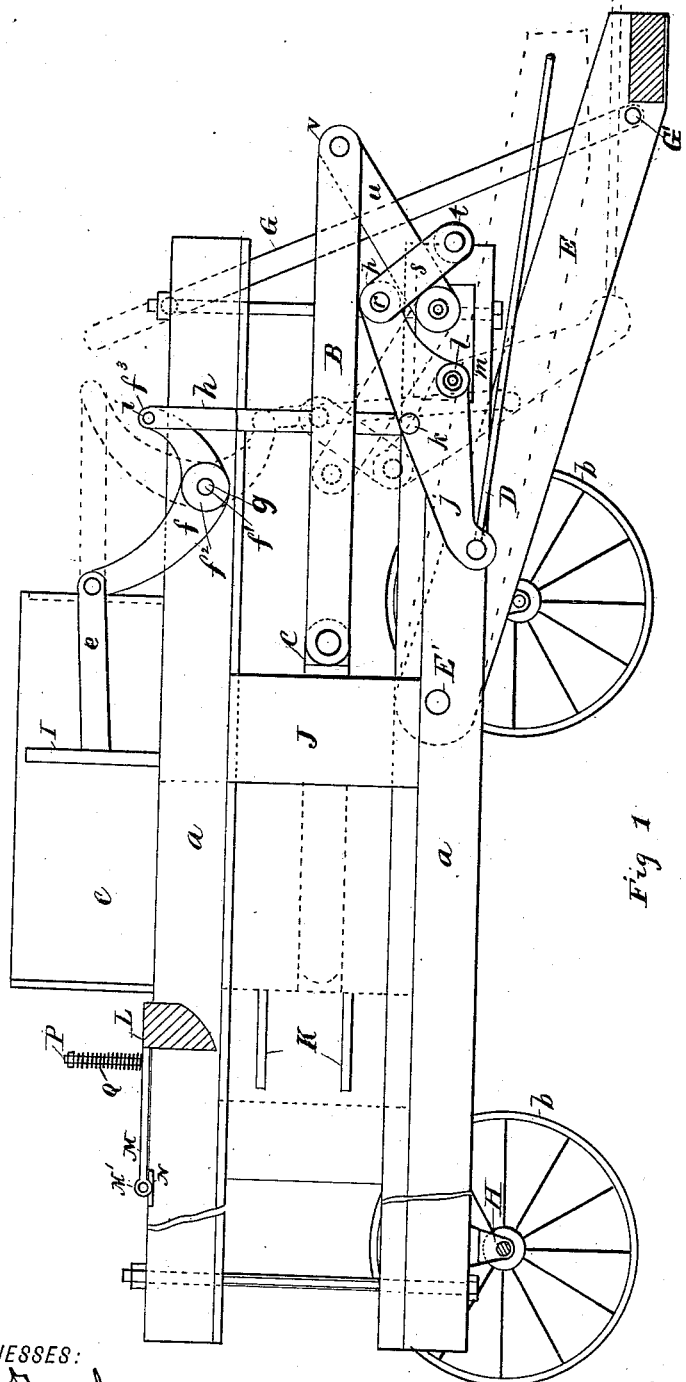

(No Model.)  2 Sheets—Sheet 1.

G. JOHNSON.
BALING PRESS.

No. 376,527.  Patented Jan. 17, 1888.

WITNESSES:
R. W. Arnold
W. L. Kennedy

INVENTOR
Gustaf Johnson
BY R. M. McDermott
his
ATTORNEY

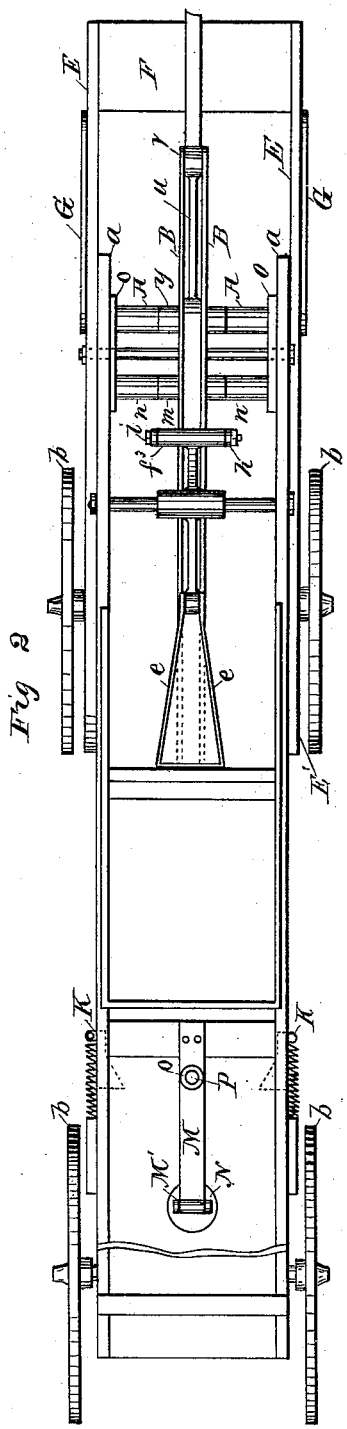

UNITED STATES PATENT OFFICE.

GUSTAF JOHNSON, OF DENVER, COLORADO.

BALING-PRESS.

SPECIFICATION forming part of Letters Patent No. 376,527, dated January 17, 1888.

Application filed August 22, 1887. Serial No. 247,502. (No model.)

*To all whom it may concern:*

Be it known that I, GUSTAF JOHNSON, a citizen of the United States, residing at Denver, in the county of Arapahoe and State of Colorado have invented certain new and useful Improvements in Baling-Presses; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to baling-presses.

The object of my invention is to provide a simple, cheap, yet powerful and durable baling-press. I accomplish this object by the mechanism illustrated in the accompanying drawings, in which—

Figure 1 is a side view of my newly-invented baling-press with the top, bottom, and one side of the frame removed, showing the operating mechanism. Fig. 2 is a top view of the same.

Similar letters refer to similar parts throughout the several views.

In the drawings, $a$ represents the main frame of the press mounted on wheels $b$. The condensing-box C is secured to the top of the frame by any suitable means. In this box $c$ the condensing-plunger I operates. This plunger is provided with arms $e$, the outer ends of which are pivoted to the long arm of the lever $f$, which is fulcrumed at $f'$ by the bolt $g$, which passes through the hub $f^2$, and also through the main frame. On the outer end of the short arm of the lever $f$ is formed the hub $f^3$. To the extremities of this hub are pivoted the operating-bars $h$ by the bolt $i$. The opposite ends of these bars are placed on opposite ends of an axle projecting from the main cam $j$, which ends are marked $k$, the axle passing through a hole near the end of the bars.

The main cam-lever $j$ is fulcrumed at $l$ on a bolt passing through the hub $m$, which bolt also passes through the bearings $n$ $n$, which project from the plates $o$, held in position in the main frame by bolts passing through them. On the upper end of the main cam $j$ is formed a short hub, $p$. To the extremities of this hub are pivoted (by the bolt $r$) the short coupling-bars $s$. In the lower extremities of these bars is placed a friction-wheel, $t$, (partly shown by dotted lines.) Between these bars the arm $u$ passes, which is provided with a short hub, $v$, on its upper end and a long hub, $y$, on its lower end, which hub is held in position by a bolt passing through the hub and also through the bearings A A. To the extremities of the hub $v$ are pivoted the outer ends of the two plunger-arms B, the opposite ends of which are pivoted to a projection, $c$, on the plunger J. To the lower end of the main cam $j$ is pivoted the actuating-rod D, the opposite end of which is attached to the motive power.

The connecting-frame (which consists of the side bars, E E, cross-bar F, and adjusting-braces G G) is for the purpose of connecting the press-frame with the frame of the motive power and holding the two frames in line with each other, which is accomplished by bolting or bracing the frame of the power mechanism when in use to the cross-bar F, which is firmly fixed to the side bars, E, which are pivoted to the frame by bolts at E'. The adjusting-bars are for the purpose of holding the connecting-frame in any position to which it may be adjusted, which varies from that shown in the drawings to that shown by dotted lines, Fig. 1, the lower ends of these bars being pivoted to the connecting-frame at G', and opposite ends being bolted to the upper portion of the press-frame. The tongue for guiding and transferring the press from place to place may be attached to the axle H of the front wheels.

In operating, any power which will impart a reciprocating motion to the actuating-rod D may be used. The mechanism of the press being in the position shown in the drawings, the material to be compressed is passed into the condensing-box C in front of the plunger I, which, as it passes along in the box C from the position shown in dotted lines to the position shown in full lines concentrates the mass over an opening in the top of baling-chamber and in front of the plunger J. This mass of material is then passed by the operator down into the baling-chamber in front of the plunger J, which then presses it out past the retainers K, which are of ordinary construction, and which prevent the compressed mass from returning. The discharging end of the baling-chamber being smaller than the opposite end, the material being baled is thereby frictionally held or retarded until forced out after being bound by the baling-ties.

The folder L is for the purpose of folding into the bale any loose material which may be drawn over the top of the plunger; and it consists of a cross-bar formed as shown, and is held in position by the hinged arm M, which is screwed to the top of the folder at one end and is hinged at M' to the cast plate N. There is a hole, O, in the arm M, through which the bolt P is passed, and which is secured in the top of the frame. This bolt is provided with a nut adapted to be screwed on the bolt. A spiral spring, Q, is then placed around the bolt, its lower end resting on the arm M and its upper end resting against the under side of the nut on the bolt, which nut is for the purpose of adjusting the spring. The folder is raised by any material resting on the top of the plunger, and after the mass has passed by the folder the spring forces the arm M down, which brings the folder to its normal position and prevents the material from again returning.

Having now fully described my invention, what I claim as new, and desire to secure by Letters Patent, is—

1. The combination, with the plunger J, of the arms B and u, forming a toggle-joint, cam-lever j, coupling-bars s, and the actuating-rod D, substantially as described.

2. The combination, with the frame a of a baling-press, of the connecting-frame E F and adjusting-bars G, as set forth.

3. The combination of the main baling-head or plunger J, arms B and u, condensing-plunger I, arms e, bent lever f, operating-bars h, cam-lever j, coupling-bars s, and actuating-rod D, substantially as described.

4. The combination of the plunger J, arms B and u, cam-lever j, coupling-bars s, actuating-rod D, and folder consisting of the cross-piece L, hinged arm M, bolt P, and spring Q, substantially as described.

In testimony whereof I affix my signature in presence of two witnesses.

GUSTAF JOHNSON.

Witnesses:
R. M. McDERMOTT,
B. L. POLLOCK.